Aug. 21, 1962 W. H. KETNER ET AL 3,050,133
HORSESHOES
Filed Sept. 15, 1958
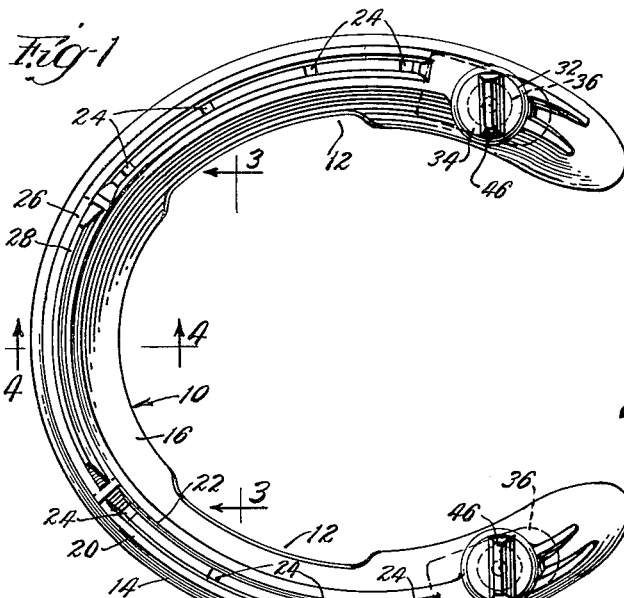
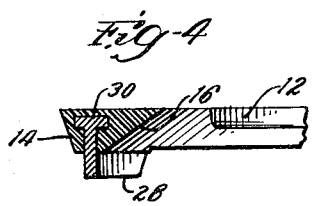
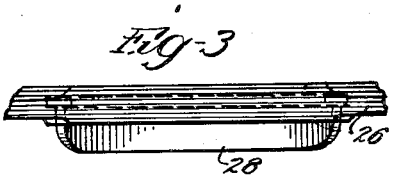
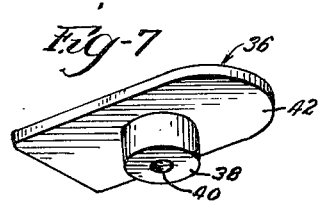
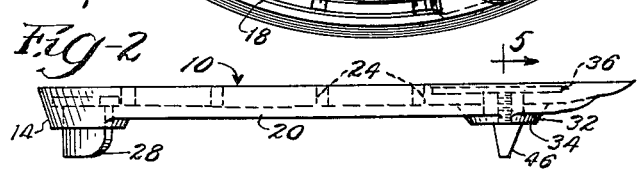
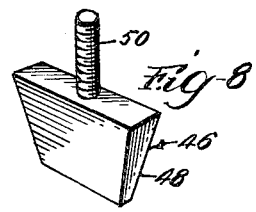
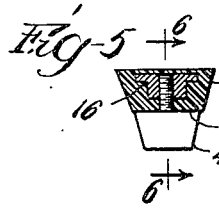
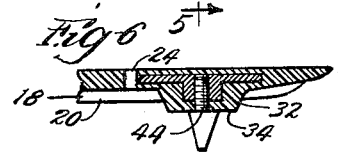
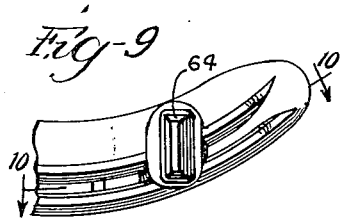
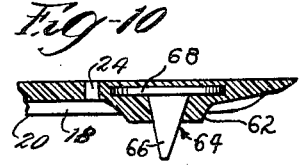
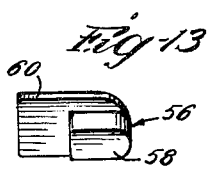
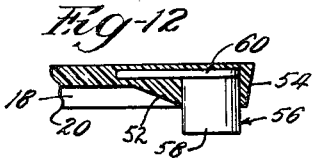
INVENTORS.
William H. Ketner &
John R. Neale, Jr.
By: Matthew C. Thompson

United States Patent Office

3,050,133
Patented Aug. 21, 1962

3,050,133
HORSESHOES
William H. Ketner, Kensington, Md. (520 Spruce St., Roaring Spring, Pa.), and John R. Neale, Jr., Raton, N. Mex. (4609 Emery Way, El Paso, Tex.)
Filed Sept. 15, 1958, Ser. No. 760,970
5 Claims. (Cl. 168—4)

This invention, in general, relates to improvements in horseshoe construction. More particularly, the invention relates to horseshoes which are particularly suitable for racing horses.

The foot of a horse has a natural hydraulic system which serves as a shock absorber for the foot and leg while the horse is running. Wild horses have travelled over burning sands and rocky terrain on sound feet and legs for years without veterinary assistance, yet the useful life of many hundreds of valuable domestic racing horses ends prematurely each year from foot and leg trouble. In many instances, it is believed that foot and leg injuries are traceable to lack of proper functioning of the shock-absorbing system of the foot.

Briefly, the natural hydraulic system of a horse's foot functions in the following manner. When the foot strikes the ground, pressure is placed upon the frog, the triangular, elastic, horny pad in the middle of the sole of the horse's foot. The frog then expands and causes a small, outward expansion at the bottom of the outer wall of the foot. When the wall of the foot expands at the bottom, the lateral cartilages of the foot are forced inward and hold blood in the foot while pressure is exerted. The blood thus trapped in the foot serves as a hydraulic cushion for all of the hard structures of the foot while weight is on it.

When weight is removed from the foot it contracts to its former position and the above process is reversed. The trapped blood in the foot is released suddenly and is forced up the leg. Thus, the foot may be considered to be in the nature of an auxiliary heart. This expansion and contraction is essential to the maintenance of a healthy foot and ultimately a sound leg.

Racing horses are shod as a safety measure to prevent slipping. However, when the horse is shod with aluminum or steel shoes, this normal expansion and contraction of the foot is stopped and the following chain of pathology results. First, the hard structures of the foot are not protected by the hydraulic blood cushion. Second, the stoppage of the normal expansion and contraction pattern causes abnormal contraction of the horny wall of the foot. This, in turn, causes pinching of all of the structure inside the horny wall. Third, the breaking of the normal expansion-contraction pattern also prevents the foot from providing its natural auxiliary heart action and thus impairs what would otherwise be normal blood circulation in the leg, except during vigorous periods of exercise.

To counteract the increased shock placed on the foot, which has lost its hydraulic action due to the impairment of the otherwise normal expansion-contraction pattern by the shoeing of the horse with metal horseshoes, it is common practice to cut away most of the frog and to thin the sole of the foot—the latter being the area between the horny wall and the frog, which has the same horny consistency as the wall. This cutting does cushion the hard structures to some extent because all of the weight falls on the wall of the foot and there is room for the frog and sole to spring downward and, thus, act as a cushion. This practice, however, hastens greatly the pathological contraction of the foot with its associated ills, and completely stops the foot from acting as an auxiliary heart. It is our belief that a great percentage of all lameness of horses has its original pathology in the feet. A horse with sore feet will invariably change his stride pattern in favor of the sore foot. This change in stride pattern becomes the cause of strained ankles, knees, tendons, etc., in many instances.

One of the primary objects of our invention relates to the development of horseshoes which will expand outwardly in the plane of the shoe and thus permit the horse's foot to expand and contract substantially as it would if the horse did not have any shoes. This function is achieved by constructing the horseshoes of our invention from a synthetic resin, which horseshoe has a resilient construction which will permit the shoe to expand outwardly in the order of $1/16$–$1/8$ inch when the horse's weight is placed upon the shoe. This expansion is sufficient to permit the shod foot to expand in accordance with its normal functioning. Our improvements in horseshoe construction are particularly suitable for horseshoes to be used on racing horses whose feet and legs are subjected to extreme shocks and strains while running at full speed on dirt and grass tracks.

Another feature of our invention is the provision of removable calks for the plastic horseshoes herein contemplated. The horseshoes for the forefeet normally have only a toe calk. However, under muddy track conditions, the horseshoes employed for the forefeet contain on each side segment of the shoe a broad, relatively sharp calk known as a jar calk, sometimes called a mud calk. The jar calks prevent the forefeet from slipping forwardly while the horse is running and are thought to be beneficial not only in preventing spills, but also in giving the horse greater assurance with regard to slipping, so that he will run at full speed under slippery track conditions.

The front shoes containing jar calks are, in accordance with all heretofore known practices of which we are aware, manufactured separately. When muddy track conditions are encountered, it is necessary to remove the front shoes containing only a toe calk and replace these shoes with the so-called mud shoes. Then, immediately after the race, the front shoe must be removed and replaced with a shoe without jar or mud calks to prevent self-inflicted injury by the sharp jar calks. For example, if a horse is raced once a week, each time on a muddy track, the number of changes of front shoes for one month will be at least eight. If these changes are too frequent, they do not give the horny structure of the horse's foot sufficient time to grow tightly about the nail hole in the foot and the shoe may become loose—the nail hole being the same in each change of shoes.

With removable calks it is only necessary to remove the jar calk from the shoe or place it on the shoe. Changes of the shoe to adapt to prevailing track conditions becomes unnecessary and the horny structure of the horse's foot has sufficient time to grow about the nail and secure it tightly in the foot. The danger of loose shoes is not a factor to be contended with since it is possible to change the shoe type from a mud type shoe to a shoe suitable for dry track conditions or vice versa by simply removing or adding the jar or mud calks to suit the prevailing track conditions.

It is, therefore, an object of the present invention to provide improvements in horseshoes wherein the shoes permit the shod horse's foot to expand and contract in accordance with its normal functioning.

Another object of the invention is to provide improvements in lightweight horseshoes for racing horses.

Another object of the invention is to provide horseshoes which expand in the normal plane of the shoe when weight is placed upon the horse's foot.

Still another object of the invention is to provide horseshoes for racing horses comprising a synthetic resin horseshoe body in which are removably-secured calks.

A still further object of the invention is to provide improvements in racing horseshoes having removable calks.

These and other objects of the invention which will be apparent to those skilled in the art from the following detailed description, may be attained by horseshoes constructed in accordance with the following description in conjunction with the drawings wherein:

FIG. 1 is a bottom plan view of a plastic horseshoe manufactured in accordance with the invention in one preferred form thereof;

FIG. 2 is a side elevation of the horseshoe of FIG. 1;

FIG. 3 is an elevation of the horseshoe of FIG. 1 taken along section 3—3 of FIG. 1;

FIG. 4 is a sectional view taken on section 4—4 of FIG. 1;

FIG. 5 is a sectional view taken on section 5—5 of FIG. 2;

FIG. 6 is a sectional view taken on section 6—6 of FIG. 5;

FIG. 7 is a perspective view of a lock nut adapted to be embedded in the horseshoe body;

FIG. 8 is a perspective view of a removable jar calk;

FIG. 9 is a partial, bottom plan view of an embodiment of a horseshoe having a fixed jar calk;

FIG. 10 is a sectional view taken on section 10—10 of FIG. 9;

FIG. 11 is a partial, bottom plan view of a hindfoot horseshoe showing the block calk;

FIG. 12 is a sectional view taken on section 12—12 of FIG. 11; and

FIG. 13 is a perspective view of a block calk.

Referring to the drawing wherein preferred embodiments of the invention are illustrated, the laterally expandable horseshoes of this invention comprise a generally U-shaped synthetic resin shoe body 10 which may have weakened zones 12 along the side segments thereof. While it is customary to manufacture horseshoes in various sizes, sometimes minor adjustments of the shoe must be made in order to fit it to an individual foot. These weakened zones aid in bending the shoe either inwardly or outwardly to conform with the shape of an individual foot—the bending preferably being done after mild application of heat in the area of the weakened zones 12.

The body 10 of the synthetic resin horseshoe has a sloping, outer wall 14 and sloping, inner wall 16 running from the top of the shoe to ridges 20 and 22 respectively. Between the ridges 20 and 22 are curved recesses 18. Extending in a transverse direction through the shoe body at the bottom of the recesses 18 are spaced nail holes 24 through which the nails are driven to secure the shoe to the horse's foot.

It is also within the contemplation of our invention to fasten the shoes to the horse's feet by quick-drying adhesive or cement rather than by nailing. The resin body of the shoe is particularly suited for this type of bonding. A worn shoe is removed simply by cutting the horny wall of the foot immediately above the shoe.

At the forward part of the shoe body is a raised toe portion 26 of resin formed integrally with the remainder of the resin of the shoe body. Within this raised portion is mounted a curved, steel toe calk 28 at the toe end of the shoe. The curved calk is employed on shoes for the forefeet and hindfeet regardless of track conditions and, hence, there is no necessity for making this calk removable. Therefore, the metal toe calk 28 is rigidly secured in the resin body of the shoe by providing integral flanges 30 at the base of the toe calk 28, which flanges secure the toe calk in the resin body against displacement.

The horseshoe illustrated in FIG. 1 is designed for use on the forefeet of racing horses. These shoes, where designed for muddy track conditions, are provided with a jar calk (mud calk) positioned on the side segments of the horseshoe at points spaced somewhat forwardly of the terminal ends of the shoe. In accordance with the invention, these jar calks, which are used ordinarily only under wet track conditions, may be made removable so that they may be placed on or removed from the shoe without the removal and replacement of the entire shoe. To provide this removable feature of the invention, each side segment of the horseshoe body is provided with, at points spaced somewhat forwardly of the terminal ends of the shoe, frusto-conically-shaped, raised portions 32 having a flat upper surface 34. Embedded in the shoe body below the raised portions 32 are lock nuts 36 having a cylindrical segment 38. The segment 38 has an internally-threaded axial aperture 40, which is positioned substantially coaxially with the center of the round, flat surface 34 of the raised portions 32. The lock nuts 36 are securely mounted in the resin body by the provision of flanges 42 extending outwardly about the base of the cylindrical segment 38. The resin in the raised portions 32 has apertures 44 coaxial with the apertures 40 of the lock nuts to provide communication between the threaded axial apertures 40 and the exterior of the horseshoe.

To provide a shoe suitable for muddy track conditions, it is only necessary to thread steel jar calks 46 into the lock nut apertures 40. These calks have an elongated, tapered body portion 48 preferably in the shape of a frusto-pyramid. Threaded shanks 50 extend from the bases of the jar calks, the threads thereof adapted to threadedly engage the internally-threaded apertures 40 of the lock nuts 36. The jar calks are turned down by their threaded engagement with the lock nuts until the jar calks are in tight frictional engagement with the flat surface 34 of the raised portions 32 and are turned to a point so that their longest dimension extends in a direction laterally across the shoe. The tight, frictional engagement of the jar calks with flat surfaces 34 protects the threads by sealing against water seepage. To further protect against water seepage into the threaded portions, the aperture 44 in the raised portion 32 of the resin body of the horseshoe may be made slightly smaller than the shank 50 to provide tight, frictional engagement at this point and, thus, also protect the threads against rusting or corroding. The resin body of the horseshoe is eminently suitable to provide this sealing function because of its somewhat resilient nature.

When the horse is to be run under dry conditions, the calks 46 are removed and, if desired, may be replaced by externally-threaded plugs to protect the apertures of the lock nuts against corrosion and rusting and also against filling up with dirt from the track or other ground areas. The plug may have a small flange at the upper end to provide a sealing function similar to the sealing function of the calks 46 and may also be provided with a hexagonal or elongated recess at the outer end to facilitate turning down the plug into the lock nut by an Allen-head wrench or screwdriver, respectively.

The forefeet horseshoes of our invention which are made for wet track conditions may also be made with fixed, rather than removable, jar or mud calks. Referring to FIGS. 9 and 10, this embodiment of the invention utilizes steel jar or mud calks 64 having a frusto-pyramidal body portion 66 and a lower flange 68 integral therewith. The lower flange is shown as being round, but other shapes may be used. The calk 64 is anchored firmly in the resin body of the shoe by the flange 68 and is further secured against displacement by the raised resin portion 62 integral with the resin body of the shoe. The remainder of the shoe is identical to that shown in FIG. 1.

In this embodiment of our invention, another set of forefeet shoes is necessary for shodding the horse to run under dry track conditions. This set of shoes contains only a toe calk and is constructed as described and illustrated with respect to FIGS. 1–3 with the omission of the raised portion 32 and the lock nut and removable calk 36 and 46, respectively. If desired, the ridges 20 and 22 and recess 18 may be continued to the ends of the shoes.

The segmental illustrations in FIGS. 11 and 12 show a portion of a horseshoe which is designed for use on the hindfeet. This horseshoe does not utilize jar calks, but rather utilizes block calks positioned at the rearward ends of the legs of the horseshoe. The remainder of the horseshoe is constructed in similar fashion to the horseshoe shown in FIGS. 1–3. In the hindfoot shoe, there is provided at the end of each leg of the shoe a resin heel portion 52 integral with the remainder of the shoe body. The round, rearward edge, of the raised portion has a sloping outer surface 54. Mounted within the heel portion 52 and extending outwardly therefrom is a steel block calk 56 composed of a calk body portion 58 and a base flange 60. The block calk has a rounded rear face and a flat forward face. These calks are used on the rear foot irregardless of track conditions and, hence, may be mounted permanently in the plastic body of the shoe, the calk being secured within the plastic body of the shoe by means of the base flange 60.

The synthetic resin horseshoes are molded into the desired shape with the calks and/or lock nuts 36 embedded therein by conventional resin molding techniques. There are many synthetic resins which have sufficient mechanical strength to make the horseshoes of the instant invention, while providing the small amount of resiliency needed to permit outward expansion of the horseshoe with the horse's foot. For example, one type of synthetic resin may be a mechanical mixture of polystyrene modified with 10–50% of the polyacrylonitrile or polybutadiene. Another example is a polyvinylchloride resin modified with neoprene to give a nonbrittle resinous mixture. In general, thermoplastic resins are preferred to thermosetting resins.

One of the most preferred resins for making the resinous horseshoe bodies are the epoxy resins which are condensation products of epichlorohydrin and diphenols. The diphenol may be bis-phenol, diphenylol methane or diphenylol propane, the latter usually being used in commercial epoxy resins.

In an uncured state the epoxy resins are thermoplastic and may range from low viscosity to high viscosity liquids, depending upon the degree of polymerization. Hardening or curing of the epoxy resin is accomplished by reaction of the resin with a curing agent at room temperature or elevated temperature. Amines, acids and other resins are the curing agents most commonly employed. The amines used in order to obtain the required cross-linking in the curing of the epoxy resin are di-, tri- and other polyamines. The acids preferably are difunctional acids, usually an anhydride form of dicarboxylic acid.

In room temperature curing systems, triethylene tetramine may be employed. The curing time ordinarily will be within the range of 15 minutes to 1½ hours. The curing agent is added to the uncured epoxy resin just prior to putting the materials in the mold form.

In acid cured systems, using materials such as phthalic anhydride, the curing is carried out at temperatures higher than 60° C. because precipitation of phthalic anhydride occurs below 60° C.

Instead of triethylene tetramine or phthalic anhydride, the curing agent may be diethylene triamine, tetraethylene pentamine, maleic anhydride, etc. Another curing agent which may be used is a complex anhydride, hexachloroendomethylene tetrahydrophthalic anhydride. With this material it is preferred that the curing be carried out at temperatures in the range of about 160–200° C. for at least two hours and preferably for about twenty-four hours.

We consider epoxy resins compounded with Thiokol liquid polymers to be especially useful in the manufacture of the horseshoes of our invention. For example, a molding or casting formulation of 100 parts of Thiokol LP–3, an aliphatic polymer containing disulfide links and reactive terminal groups, 200 parts of epoxy resin and 20 parts of triethylene tetramine may be employed as the casting compound. Curing of the Thiokol-epoxy resin-triethylene tetramine is carried out at room temperature or slightly elevated temperature. If desired, the molded horseshoes may be further heat-cured.

However, it will be understood that there are many other resins and formulations which may be employed for the resin body of the horseshoe without departing from the spirit and scope of our invention. Where desirable or necessary, fibrous materials such as fiberglass, sisal, etc., may be incorporated into the resinous horseshoe body.

The invention is hereby claimed as follows:

1. A horseshoe for racing horses comprising a synthetic resin horseshoe body, an elongated, metal toe calk embedded in the resin of the toe portion of said horseshoe body, which body is of generally U-shaped configuration with the central portion of said horseshoe body being open, said synthetic resin horseshoe body being expandable laterally with the horse's foot when the horse is running, said horseshoe body further having a raised resin portion on each side segment thereof, a flat surface on each raised portion, an internally-threaded member mounted in said resin body at said raised portion, and a removably-mounted calk having a threaded shank threadedly engaging said internally threaded member, said calks projecting from the lower surface of said horseshoe body.

2. A horseshoe for racing horses comprising a synthetic resin horseshoe body, an elongated, metal toe calk embedded in the resin of the toe portion of said horseshoe body, which body is of generally U-shaped configuration with the central portion of said horseshoe body being open, said synthetic resin horseshoe body being expandable laterally with the horse's foot when the horse is running, said horseshoe body further having a raised resin portion on each side segment thereof, a flat surface on each raised portion, an internally-threaded member mounted in said resin body at said raised portion, and calks each having a frusto-pyramidal body portion and a threaded shank extending from the base of the frusto-pyramidal body portion, said calks being removably-mounted on said horseshoe by threaded engagement of said shank with the threads of said internally-threaded members, the base of said frusto-pyramidal body portion adapted to be in tight frictional contact with each of said raised portions when said calks are mounted on said horseshoe, said calks projecting from the lower surface of said horseshoe body.

3. A horseshoe for racing horses comprising a synthetic resin horseshoe body of generally U-shaped configuration with the central portion of said horseshoe body being open, said synthetic resin horseshoe body being expandable laterally with the horse's foot when the horse is running, said body having embedded in the toe portion an elongated, curved, metal toe calk, having a raised resin portion on each side segment thereof, a flat surface on each raised portion, an internally-threaded member mounted in said resin body at said raised portion, and a removably-mounted calk having a threaded shank threadedly engaging said internally-threaded member, said calks projecting from the lower surface of said horseshoe body.

4. A horseshoe for racing horses comprising a synthetic resin horseshoe body of generally U-shaped configuration with the central portion of said horseshoe body being open, said synthetic resin horseshoe body being expandable laterally with the horse's foot when the horse is running, said body having embedded in the toe portion an elongated, curved, metal toe calk, having a raised resin portion on each side segment thereof, a flat surface on each raised portion, an internally-threaded member mounted in said resin body at said raised portion, and calks each having a frusto-pyramidal body portion and a threaded shank extending from the base of the frusto-pyramidal body portion, said calks being removably mounted on said horseshoe by threaded engagement of said shank with the threads of said internally-threaded members, the base of said frusto-pyramidal body portion being in tight frictional contact with each of said raised portions when said calks are mounted on said horseshoe, said calks projecting from the lower surface of said horseshoe body.

5. A horseshoe for racing horses comprising a synthetic resin molded in the form of a continuous resin body of generally U-shaped configuration with the central portion of said horseshoe body being open, said synthetic resin horseshoe body being expandable laterally with the horse's foot when the horse is running, said body having in the toe portion a curved, metal, toe calk with a flange at the base thereof, said flange being embedded in the toe portion of said resin body to anchor the metal toe calk in said toe portion and said calk projecting from the lower side of said toe portion of said resin body, a metal member embedded in each side portion of said resin body, said members each having an internally threaded hole opening toward the lower surface of said horseshoe and also having a flange embedded in said resin body, and a metal jar calk having a threaded shank threadedly engaged with the threads of each of said internally threaded holes, the base of said calk being seated tightly against the lower surface of said resin body and said calk projecting outwardly from said lower surface.

References Cited in the file of this patent

UNITED STATES PATENTS

| | | |
|---|---|---|
| 108,684 | Christopher | Oct. 25, 1870 |
| 204,968 | Hall | June 18, 1878 |
| 779,148 | Abbott | Jan. 3, 1905 |
| 785,577 | Sandfield | Mar. 21, 1905 |
| 846,082 | Bellman | Mar. 5, 1907 |
| 1,187,332 | Keller et al. | June 13, 1916 |
| 1,271,177 | Kusiak | July 2, 1918 |
| 1,702,882 | Tweed | Feb. 19, 1929 |
| 1,777,727 | Krug et al. | Oct. 7, 1930 |
| 1,855,843 | Savidge | Apr. 26, 1932 |
| 2,157,826 | Kearney | May 9, 1939 |
| 2,353,568 | King | July 11, 1944 |
| 2,622,685 | Dixon | Dec. 23, 1952 |
| 2,705,536 | Phreaner | Apr. 5, 1955 |

FOREIGN PATENTS

| | | |
|---|---|---|
| 679,973 | Great Britain | Sept. 24, 1952 |